3,297,594
NOVEL RIGID AND SELF-EXTINGUISHING POLY-
URETHANE FOAMS AND PROCESS FOR PREP-
ARATION OF SAME
Laszlo Szobel, Grenoble, and Ludovic Parvi, Pont-de-
Claix, France, assignors to Societe d'Electro-Chimie,
d'Electro-Metallurgie et des Acieries Electriques
d'Ugine, Paris, France, a corporation of France
No Drawing. Filed July 10, 1963, Ser. No. 294,152
Claims priority, application France, July 13, 1962,
904,024
7 Claims. (Cl. 260—2.5)

This invention relates to:
(1) Compositions which produce rigid and self-extinguishing expanded polyurethanes, based on highly chlorinated polyesters, which are themselves obtained from polyols at least one of which is highly chlorinated;
(2) The expanded polyurethanes or polyurethane foams obtained from these compositions;
(3) A process for the preparation of these compositions and of these expanded materials.

The rigid, expanded polyurethanes are generally obtained from compositions which contain a polyester or a polyether and an isocyanate. Heretofore, use of these polyurethane foams has been restricted by their inflammability. Attempts to eliminate this disadvantage have been employment of a corrective agent as follows:

By addition of different filling substances such as antimony oxide, various chlorinated products, various phosphoric or phosphonic esters, etc., or their mixtures,.

By the introduction into the polyester molecule of chlorinated compounds, specifically those derived from the addition of a hexahalocyclopentadiene and maleic anhydride.

However, the problem has been but partially solved by these methods for either the self-extinguishing properties secured are impermanent and the corrective agent has disappeared in time by evaporation, lixiviation, etc., or the self-extinguishing characteristics are imperfect, or the mechanical properties of the expanded materials obtained are considerably degraded.

Applicants have obtained novel compositions of polyurethanes resulting in rigid, expanded materials which have genuinely and durably self-extinguishing properties by reacting polyisocyanates and highly chlorinated polyesters. The resulting polyurethanes have a high chlorine content supplied by at least one of the polyols used in their preparation.

The polyisocyanates which are utilized are preferably aromatic liquids. They may be selected from the following, without this list being limited: 2,4-toluylene diisocyanate, 2-6-toluylene diisocyanate, trimethylene diisocyanate, hexamethylene diisocyanate, ethylene diisocyanate, 1,2-propylene diisocyanate, etc. They may be solid, moreover, subject to having low enough a melting point or to being soluble in other reactants which are used in production of the polyurethanes. Such polyisocyanates include 4,4'-diisocyanate of diphenylmethane. Mixtures of polyisocyanates are also used.

The polyesters which we use are those resulting from the reaction of a diacid with polyols of which at least one is highly chlorinated.

The diacids include: maleic, fumaric, phthalic, tetrachlorophthalic, succinic, adipic acids, HET acid (hexachloroendomethylenetetrahydrophthalic acid) and those derived from halo-polyphenols, etc., alone or in mixture.

The non-chlorinated polyols which are used mixed with the highly chlorinated polyols are, for example: glycerin, trimethylolpropane, pentaerythritol, glycol, propylene glycol, etc. The highly chlorinated polyols have the general formula:

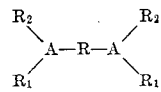

in which
R represents a polyhalo-diphenyl radical,
A is a metalloidal atom which is at least divalent and is, for example, nitrogen, oxygen, sulphur, phosphorus, silicon, etc.,
$R_1$ is selected from the group consisting of a saturated aliphatic radical, an unsaturated aliphatic radical, a cyclic radical, a heterocyclic radical, each radical carrying at least one hydroxyl function.

Where A is a metalloidal atom having a valency exceeding 2, it has one or more radicals $R_2$ which are selected from the group consisting of a hydrogen atom, a radical identical to those of $R_1$, or radicals different from $R_1$.

Among the highly chlorinated polyols are included:
The diols which have the general formula:

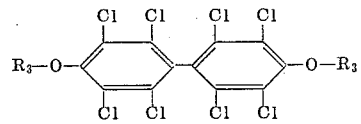

in which $R_3$ is selected from the group consisting of a saturated aliphatic radical, an unsaturated aliphatic radical, a cyclic radical, a heterocyclic radical, each radical carrying at least one hydroxyl function. One specific example of such a diol is bis(hydroethoxy) octochlorodiphenyl.

The diols which have the general formula:

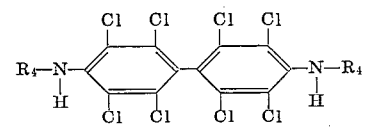

in which $R_4$ is selected from the group consisting of a saturated aliphatic radical, an unsaturated aliphatic radical, a cyclic radical, a heterocyclic radical, each radical carrying at least one hydroxyl function. One specific example of these diols is N,N'-bis(ethane 2-ol) diaminooctochlorodiphenyl which forms part of the family of products covered in our U.S. patent application filed June 6, 1963, Serial No. 285,869, for "Novel Industrial Products Formed by Biaminated Derivatives of Polychlorodiphenyl."

In the case in which one of the polyols is trimethylolpropane, the polyesters according to the invention have the following formula:

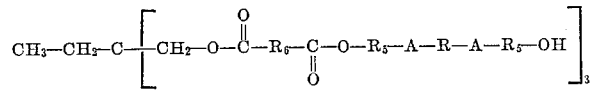

in which

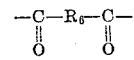

represents the remainder of a diacid, and $R_5$ is selected from the group consisting of a saturated aliphatic radical, an unsaturated aliphatic radical, a cyclic radical, and a heterocyclic radical.

Depending upon the diacids and dialcohols selected, the polyesters will be liquid or solid and will have greater or lesser chlorine contents.

Applicants prefer to employ a polyester having a sufficient chlorine content, and a polyester/isocyanate ratio such that the polyurethane formed contains at least 30% of chlorine. Polyesters having a chlorine content of this magnitude are solid as a rule.

For the production of the compositions according to the invention, the polyesters obtained as previously specified are reacted with the polyisocyanates. For this purpose, these polyesters may be dissolved in alkanes and/or halogenated alkenes, or in a mixture of same. These alkanes and alkenes contain less than 5 atoms of carbon, which act as foaming agents or not, and are characterized by the presence of a mobile hydrogen in their molecule. Also, these alkanes and/or alkenes are used in their turn, alone or in a mixture with one or more other foaming agents. The following are non-limiting examples of such alkanes and alkenes: methylene chloride, chloroform, dichlorofluoromethane, a mixture of chloroform and vinyl chloride, etc. The polyisocyanate is introduced in amounts of 0.3 to 1.3 isocyanate groups, preferably of 0.8 to 1.1, per hydroxyl group of the polyester.

Generally, to cause the formation of the foam or expanded material, an accelerator is added to the polyester-isocyanate mixture with the object of regulating the setting speed of the foam and the uniformity of the pores, and contingently a surface-active agent. This accelerator may, for example, be formed by water, polyoxyethylene glycol, and a tertiary amine, in the proportions of 10/10/5 and may be added at the rate of 5% to 15% by weight of polyester.

The mixtures thus obtained will, in the course of a few minutes, produce rigid and self-extinguishing expanded materials of densities which vary according to the method of operation.

The expanded materials according to the invention are characterized by their satisfactory mechanical properties and by their excellent flame-resistance. They fully comply with the ASTM D757–49 and D635–56T tests, and, moreover, when they are placed in the flame of a torch, they undergo combustion, but quench themselves without retaining red sparks as soon as they are withdrawn rfom the flame.

The following, non-limiting examples exemplify the invention. The proportions of the constituents of the mixtures are determined by weight.

*Example 1*

A polyester was prepared by the action of adipic acid on a mixture of trimethylolpropane and N,N'-bis(ethane 2-ol) diaminooctochlorodiphenyl. This polyester had a softening point of 81° C., a chlorine content of 40.4%, an acid number of 7.6, and a hydroxyl value of 180; it was of the following type:

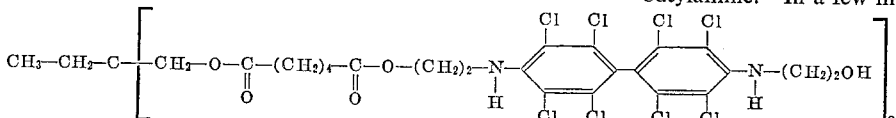

280 parts of this polyester was dissolved in 300 parts of chloroform. 100 parts of toluylene diisocyanate were added to this solution under powerful agitation at ambient temperature. To this polyester-isocyanate composition there was added, at ambient temperature and under powerful agitation, 30 parts of an accelerator composed of a mixture of 10 parts of polyoxyethylene glycol, 10 parts of water, and 5 parts of trin--butylamine. A rigid polyurethane foam which formed in a few minutes had an apparent density of 100 g./l. and possessed excellent mechanical properties. It complied fully with the specifications of the ASTM tests already referred to. In addition, when placed in the flame of a torch, the foam underwent carbonization but extinguished itself as soon as it was withdrawn from the flame.

*Example 2*

A polyester was employed which had been obtained from adipic acid, trimethylolpropane, and bis(hydroethoxy) octochlorodiphenyl. This polyester contained approximately 40% of chlorine, it had an acid number of 2.7 and a hydroxyl value of 176. It corresponded to the formula:

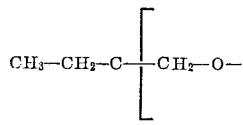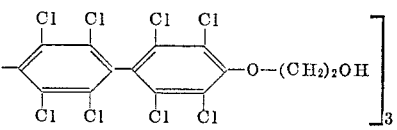

280 parts of this polyester were dissolved in 300 parts of chloroform. To this solution were added 100 parts of toluylene diisocyanate under power agitation at ambient temperature. To this polyester-isocyanate composition there were added at ambient temperature and under powerful agitation, 30 parts of an accelerator composed of a mixture of 10 parts of polyoxymethylene glycol, 10 parts of water, and 5 parts of tri-n-butylamine. A rigid polyurethane foam which formed in a few minutes had an apparent density of 120 g./l. and possessed excellent mechanical properties. It fully complied with the specifications of the ASTM tests. It underwent carbonization when placed in the flame of a torch, but extinguished itself as soon as it was withdrawn from the flame.

*Example 3*

280 parts of the polyester used in Example 1 were dissolved in 300 parts of dichlorofluoromethane, and to this solution was added at ambient temperature 100 parts of toluylene diisocyanate under powerful agitation. To this polyester/isocyanate composition there were added at ambient temperature and under powerful agitation, 30 parts of an accelerator composed of a mixture of 10 parts of polyoxyethylene glycol, 10 parts of water and 5 parts of tri-n-butylamine. A rigid polyurethane foam which formed in a few minutes had an apparent density of 60 g./l. and possessed excellent mechanical properties. It fully complied with the specifications of the ASTM tests. In addition, when placed in the flame of a torch, it underwent carbonization but extinguished itself as soon as it was withdrawn from the flame.

*Example 4*

280 parts of the polyester prepared in Example 1 were dissolved in 300 parts of a chloroform-dichlorofluoromethane mixture in a ratio of 75/25, and to this solution, at ambient temperature, 100 parts of toluylene diisocyanate were added, while stirring vigorously. At ambient temperature and while stirring vigorously, there was added to this polyester-isocyanate composition 30 parts of an accelerator consisting of a mixture of 10 parts of polyoxyethylene glycol, 10 parts of water, and 5 parts of tri-n-butylamine. In a few minutes a rigid polyurethane foam which was formed had an apparent density of 60 g./l., and possessed excellent mechanical properties. It completely satisfied the ASTM tests shown. Moreover, when placed in the flame of a burner, it underwent carbonization, but extinguished itself as soon as it was withdrawn from the flame.

*Example 5*

280 parts of the polyester prepared in Example 1 were dissolved in 170 parts of dichloroethylene, and to this solution at ambient temperature 100 parts of toluylene diisocyanate were added under vigorous agitation. While stirring vigorously this polyester-isocyanate composition and at ambient temperature, we added 30 parts of an accelerator consisting of a mixture of 10 parts of polyoxyethylene glycol, 10 parts of water, and 5 parts of tri-n-butylamine. Within a few minutes a rigid polyurethane foam was formed and it had an apparent density of 60 g./l. and excellent mechanical properties. It completely satisfied the ASTM tests specified. Moreover, when placed in the flame of a burner, it underwent carbonization but extinguished itself as soon as it was withdrawn from the flame.

*Example 6*

280 parts of the polyester prepared in Example 1 were dissolved in 156 parts of trichloroethylene and to this solution, at ambient temperature, 100 parts of toluylene diisocyanate were added while vigorous stirring was going on. While at ambient temperature and while being stirred vigorously, there were added to this polyester-isocyanate composition 30 parts of an accelerator consisting of a mixture of 10 parts of polyoxyethylene glycol, 10 parts of water, and 5 parts of tri-n-butylamine. Within a few minutes a rigid polyurethane foam was formed and it had an apparent density of 60 g./l. and excellent mechanical properties. It completely satisfied the ASTM tests specified. Moreover, when placed in the flame of a burner, it underwent carbonization but extinguished itself as soon as it was withdrawn from the flame.

*Example 7*

280 parts of polyester prepared in Example 1 were dissolved in 156 parts of dichloroethane and to this solution at ambient temperature 100 parts of toluylene diisocyanate were added while vigorous stirring was going on. While at ambient temperature and while being stirred vigorously, there were added to this polyester-isocyanate composition 30 parts of an accelerator consisting of a mixture of 10 parts of polyoxyethylene glycol, 10 parts of water, and 5 parts of tri-n-butylamine. Within a few minutes a rigid polyurethane foam was formed and it had an apparent density of 60 g./l. and excellent mechanical properties. It completely satisfied the ASTM tests specified. Moreover, when placed in the flame of a burner, it underwent carbonization, but extinguished itself as soon as it was withdrawn from the flame.

*Example 8*

280 parts of the polyester prepared in Example 1 were dissolved in 200 parts of a chloroform-vinyl chloride mixture in a ratio of 80/20, and to this solution, at ambient temperature, 100 parts of toluylene diisocyanate were added while vigorous stirring was going on. While at ambient temperature and while being stirred vigorously, there were added to this polyester-isocyanate composition 30 parts of an accelerator consisting of a mixture of 10 parts of polyoxyethylene glycol, 10 parts of water, and 5 parts of tri-n-butylamine. Within a few minutes a rigid polyurethane foam was formed and it had an apparent density of 60 g./l. and excellent mechanical properties. It completely satisfied the ASTM tests specified. Moreover, when placed in the flame of a burner, it underwent carbonization, but extinguished itself as soon as it was withdrawn from the flame.

*Example 9*

A mixture of a polyester prepared according to Example 1 and a polyester with a triol, diethylene glycol and adipic acid base was added at the rate of 70 parts of the former and 30 parts of the latter. This mixture had a density of 1.336 and a viscosity of 3.072 cp. at 110° C.

To 100 parts of this mixture there were added, in conventional manner:

39.9 parts of toluylene diisocyanate,
5 parts of polyoxyethylene glycol,
2 parts of water,
2 parts of tri-n-butylamine, and then, 30 parts of trichlorofluoromethane. In a few minutes, a rigid polyurethane foam was formed and it had an apparent density of 50 g./l., and excellent mechanical properties. The foam completely satisfied the requirements of the ASTM tests already mentioned. Moreover, when placed in the flame of a burner, the foam underwent carbonization, but extinguished itself as soon as it was withdrawn from the flame.

*Example 10*

A polyester was prepared as in Example 1 by reacting adipic acid with a mixture of trimethylolpropane and NN' bis(ethane 2-ol) diaminooctochlorodiphenyl. 70 parts of this polyester were dissolved in 20 parts of dichloroethylene, and to this solution 30 parts of a polyester with a triol, adipic acid, and phthalic anhydride base.

To 280 parts of the mixture thus prepared were added:

132 parts of toluylene diisocyanate,
10 parts of siloxane-oxide of alkylene copolymeric ring,
10 parts of water,
5 parts of tri-ethylenediamine,
A few drops of dioctoate of tin.

In a few minutes a rigid, polyurethane foam was formed and it had an apparent density of 100 g./l., and excellent mechanical properties. It completely satisfied the requirements of the ASTM tests already mentioned. Moreover, when placed in the flame of a burner, the foam burned, but extinguished itself as soon as it was withdrawn from the flame.

*Example 11*

A polyester was prepared in accordance with the method described in French Patent 1,336,751, Example 15, by reacting sebacic acid with a mixture of glycerin and N,N'-bis(ethane 2-ol) diaminooctochlorodiphenyl. This polyester had a softening point of 70–73° C., a chlorine content of 38.1%, an acid index of 1.5, and contained 2.1% of the hydroxyl groups.

280 parts of this polyester were dissolved in 300 parts of chloroform. To this were added 100 parts of toluylene diisocyanate, while vigorously agitated and at ambient temperature. To this polyester-isocyanate composition were added 30 parts of adjuvants consisting of a mixture of 10 parts of polyoxyethylene glycol, 10 parts of water, and 5 parts of tri-n-butylamine. In a few minutes a rigid polyurethane foam was formed and it had an apparent density of 100 g./l., and excellent mechanical properties. It completely satisfied the requirements of the ASTM tests already mentioned. Moreover, when placed in the flame of a burner, the foam burned, but extinguished itself as soon as it was withdrawn from the flame.

While we have shown and described preferred embodiments of our invention, it may be otherwise embodied within the scope of the following claims.

We claim:

1. A flame-retardant rigid cellular foam formed from reacting an organic polyisocyanate and a polyester resin produced by reacting at least one dicarboxylic acid and at least one chlorinated polyol having the general formula:

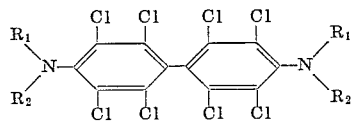

in which $R_1$ is selected from the group consisting of a saturated aliphatic radical, an unsaturated aliphatic radical, a cyclic radical, a heterocyclic radical, each of said radicals having at least one hydroxyl function;

$R_2$ is selected from the group consisting of a hydrogen atom and a radical identical to that of $R_1$;

said chlorinated polyol being present in said foam in an amount such that the resulting polyurethane contains at least 30% chlorine; said polyisocyanate being present in an amount such that the ratio of the isocyanate groups to hydroxyl groups of the polyester is 0.3:1 to 1.3:1.

2. The foam of claim 1 wherein said dicarboxylic acid is selected from the group consisting of maleic, fumaric, phthalic, tetrachlorophthalic, succinic, adipic, hexachloro-endomethylenetetrahydrophthalic, acids derived from halo-polyphenols and mixtures of same.

3. The foam of claim 1 wherein said polyisocyanate is selected from the group consisting of 2,4-toluene diisocyanate, 2,6-toluylene diisocyanate, trimethylene diisocyanate, hexamethylene diisocyanate, ethylene diisocyanate, 1,2-propylene diisocyanate, 4,4'-diisocyanate of diphenylmethane and mixtures of same.

4. The foam of claim 1 wherein same includes an accelerator which is present in an amount between 5% to 15% by weight of said polyester.

5. The foam of claim 1 wherein said polyol is N,N'-bis(ethane 2-ol) diaminooctochlorodiphenyl.

6. The foam of claim 1 wherein the polyester additionally contains at least one non-chlorinated polyol.

7. The foam of claim 6 wherein said non-chlorinated polyol is selected from the group consisting of glycerin, trimethylolpropane, pentaerythritol, glycol, and propylene glycol.

References Cited by the Examiner

UNITED STATES PATENTS

| | | | |
|---|---|---|---|
| 2,591,884 | 4/1952 | Simon et al. | 260—2.5 |
| 2,779,689 | 1/1957 | Reis | 260—2.5 |
| 2,902,518 | 9/1959 | Hurdis et al. | 260—75 |
| 3,098,047 | 7/1963 | Tapas et al. | 260—2.5 |
| 3,102,105 | 8/1963 | Collardeu et al. | 260—75 |
| 3,146,220 | 8/1964 | Hindersinn et al. | 260—2.5 |

FOREIGN PATENTS 1,012,458  7/1957  Germany.

LEON J. BERCOVITZ, *Primary Examiner.*

F. McKELVEY, *Assistant Examiner.*